Aug. 7, 1945.　　　E. O. PEARSON　　　2,381,513

JOURNAL BEARING

Filed Aug. 7, 1943　　　2 Sheets—Sheet 1

INVENTOR
ELMER O. PEARSON
BY
Cook & Robinson
ATTORNEY

Aug. 7, 1945.   E. O. PEARSON   2,381,513
JOURNAL BEARING
Filed Aug. 7, 1943    2 Sheets-Sheet 2
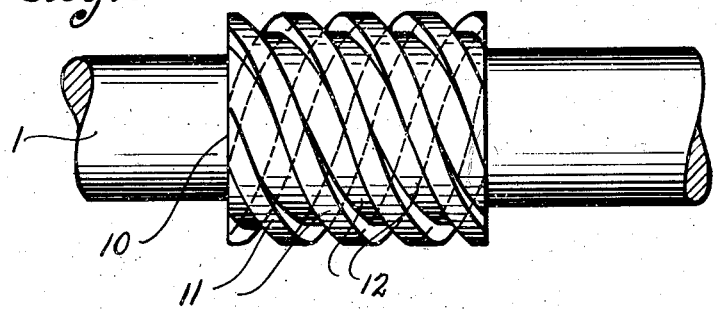
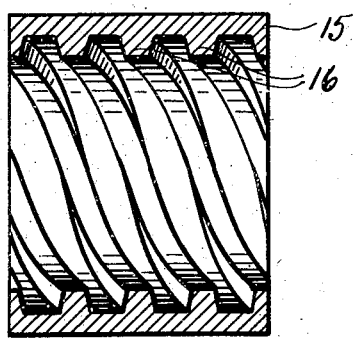
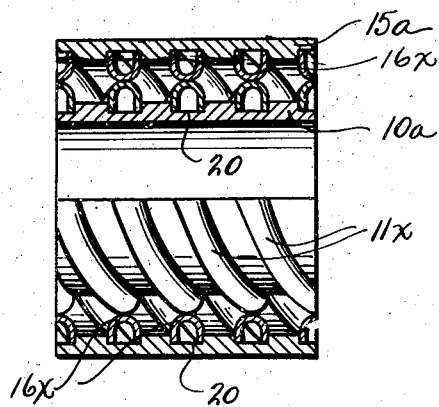
INVENTOR
ELMER O. PEARSON
BY
ATTORNEY Patented Aug. 7, 1945

2,381,513

UNITED STATES PATENT OFFICE 2,381,513

JOURNAL BEARING

Elmer O. Pearson, Seattle, Wash.

Application August 7, 1943, Serial No. 497,752

1 Claim. (Cl. 308—240)

This invention relates to bearings, and has reference more particularly to improvements in journal bearings for shafts, axles and the like; the principal object of the invention being to provide a sealed, lubricated bearing equipped with journal sleeves of improved type that adapts them to be used satisfactorily in lieu of the conventional types of anti-friction roller or ball bearings; which is self-lubricating and will retain its lubricant indefinitely without attention; which is relatively inexpensive; which is long lasting and is easy to disassemble for replacement of parts or repair should such be necessary or desired.

Still further objects of the invention reside in the details of construction and combination of its various parts, as will later be described.

In accomplishing the above mentioned and other objects of the invention, I have provided the improved details of construction, the preferred forms of which are illustrated in the accompanying drawings, wherein—

Fig. 3 is a view showing the journal sleeve in side view and as applied to the shaft.

Fig. 4 is a sectional view of the outer journal bearing, as seen in section in its axial plane.

Fig. 5 is a sectional detail of a bearing of an alternative form; the section being in the axial plane of the parts.

Figure 1:
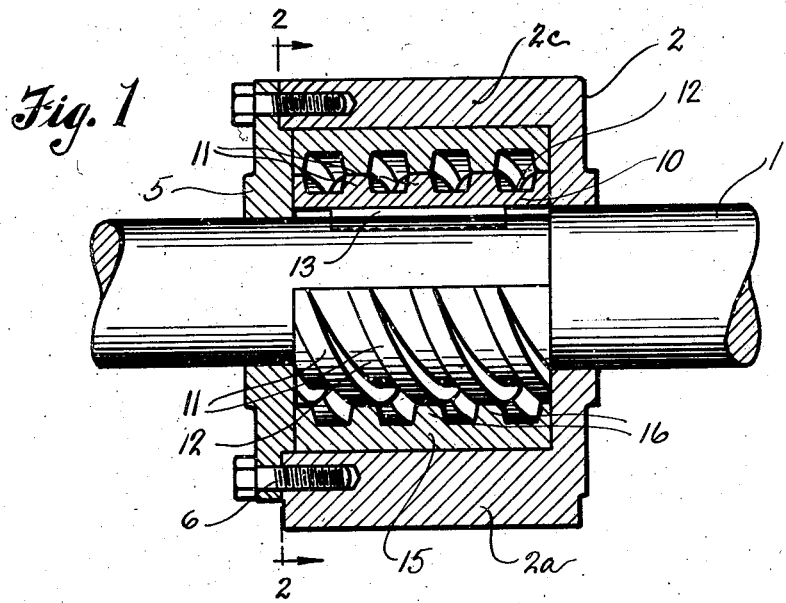
Fig. 1 is a sectional view in the axial plane of a bearing embodying the present invention.

Referring more in detail to the drawings—

1 designates what may be a driven line shaft, or the like, and 2 is a journal box through which the shaft extends and within which the present bearing is contained. The journal box, as will be best understood by reference to Fig. 2, comprises a base portion 2a that is equipped with lateral flanges 2f through whch bolts or the like may be applied for its securement to a base or support, and a cap portion 2c applied to the base portion and functionally secured in place by bolts 3; the base and the cap being separable along the longitudinal plane of the shaft, as is the usual type of bearing box. As herein shown, the bolts 3 are anchored in the base and have ends extended upwardly through flanges of the cap and with nuts 4 applied thereto to draw the cap down tight. One end of the journal box is closed by wall sections that are integral with the base and cap portions of the box, as noted in Fig. 1, and the opposite end of the box is closed by a removable cover plate 5, normally held in place by bolts 6 extended therethrough and threaded into the box walls.

Fitted to the shaft 1 within the journal box, is a sleeve 10 formed externally with a succession of spirally directed, spaced apart ribs 11. Between the ribs are grooves 12. This sleeve is fixed on the shaft so that it will turn therewith by means of a key designated at 13 in Figs. 1 and 2.

Fitted about the sleeve 10 and contained within the journal box, is a cylindrical journal bearing 15. This journal bearing is coextensive with the sleeve and fits snugly within the box. It is held against rotation in any suitable manner, for example, by the tightening of the cap thereagainst, or it could be held by a key after the fashion of holding the sleeve on the shaft. The journal sleeve is formed interiorly with a succession of spirally directed spaced apart ribs 16 of the same cross sectional dimensions as those of the sleeve, and the ribs of the two members spiral in opposite directions and at such pitch that they cross each other at approximately a 60° angle.

Figure 2:
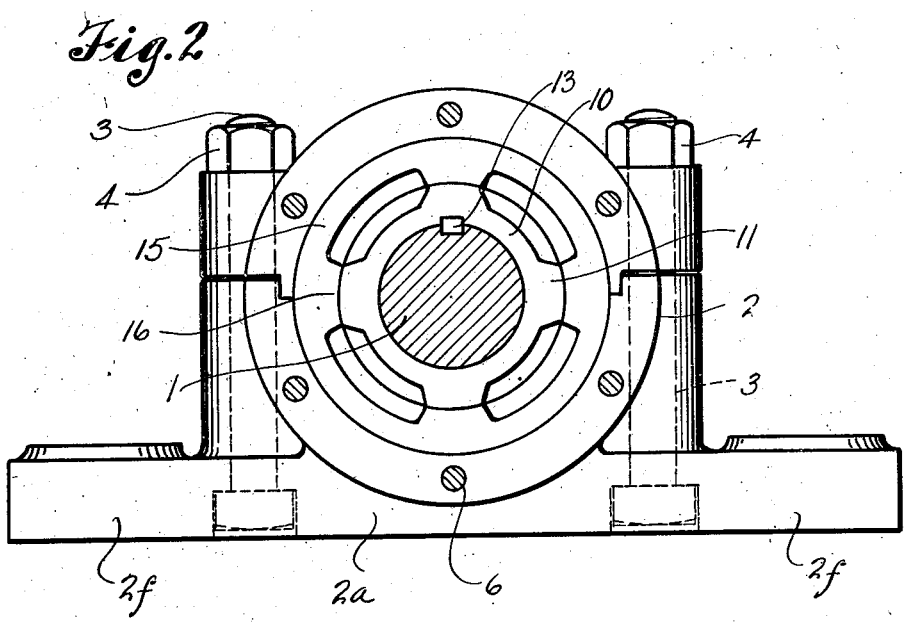
Fig. 2 is a cross sectional view taken on line 2—2 in Fig. 1, showing the journal sleeves in end view.

The engaging surfaces of the sleeve end of the journal are truly cylindrical and the ribs have flat engaging surfaces, as will be understood by reference to Fig. 1.

In the assembly of the parts above described, the sleeve 10 is first applied to the shaft; the journal bearing 15 is then fitted over the sleeve and the parts are set within the base portion of the journal box, the cap 2c is applied to the box and secured in place, and finally the end cover plate 5 is applied to the end of the box and secured.

In preparation for use, the grooves between ribs of the sleeve and journal bearing are filled with a suitable lubricant, preferably a hard grease which will be long retained due to the fact that the journal box is tightly sealed against leakage. The rib surfaces of the sleeve 10 and journal bearing 15 which bear in contact with each other are of substantial area, being substantially of the same width as the grooves between the ribs, and due to the fact that the lubricant is confined within the box, these engaging surfaces will always be kept well lubricated due to the wiping of the ribs across the grease filled grooves as the shaft rotates.

In Fig. 5, I have illustrated an alternative form of construction, wherein 10a designates a sleeve that is fitted to the shaft and 15a designates a journal sleeve that is applied to the box. Formed about the sleeve 10a and within the journal sleeve, respectively, are the oppositely directed spiral ribs 11x and 16x; each rib being formed by a strip of sheet metal bent into U-shape in cross section, with the edges of the strip set down within channels 20 cut in the supporting parts. This rib construction provides rounded engaging edges in bearing contact with each other instead of the flat contacting surfaces of the device of Fig. 1. The lubricant is here contained between ribs as in the bearing previously described.

Bearings of this kind are useful wherever journal bearings are used, and will outlast and outwear the common types due to the provision for adequate lubrication. Also, there is a saving in lubricant, with assurance of self-lubrication of the wearing surfaces.

Such bearings also can be used with satisfaction where ball or roller bearings are ordinarily preferred.

Having thus described my invention, what I claim as new therein and desire to secure by Letters Patent is:

A bearing of the character described comprising a journal box having a journal bearing formed interiorly with a succession of spaced spirally directed ribs, a shaft contained in the journal box for rotation without endwise movement and having a journal surface formed with a succession of spaced spirally directed ribs in bearing contact with and crossing those of the journal box; said journal box and said journal surface of the shaft being formed with spirally directed grooves of opposite pitch and said ribs comprising metal strips bent longitudinally to a U-shape in cross section with the longitudinal edges of the strips seated in the grooves and the rounded edges of the ribs thus formed in the box and on the shaft being in bearing contact.

ELMER O. PEARSON.